US008191075B2

(12) United States Patent
Aghajanyan et al.

(10) Patent No.: US 8,191,075 B2
(45) Date of Patent: May 29, 2012

(54) STATE MANAGEMENT OF OPERATING SYSTEM AND APPLICATIONS

(75) Inventors: Suren Aghajanyan, Bellevue, WA (US); Craig Anthony Osborne, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1096 days.

(21) Appl. No.: 12/043,941

(22) Filed: Mar. 6, 2008

(65) Prior Publication Data

US 2009/0228905 A1   Sep. 10, 2009

(51) Int. Cl.
*G06F 3/00*   (2006.01)
(52) U.S. Cl. ...................................... 719/310
(58) Field of Classification Search .................... 719/310
See application file for complete search history.

(56) References Cited

U.S. PATENT DOCUMENTS

| | | |
|---|---|---|
| 6,847,970 B2 | 1/2005 | Keller et al. |
| 7,043,724 B2 | 5/2006 | Blume et al. |
| 7,069,553 B2 | 6/2006 | Narayanaswamy et al. |
| 7,107,441 B2 * | 9/2006 | Zimmer et al. .................. 713/1 |
| 7,568,185 B1 * | 7/2009 | Shapiro et al. ................ 717/130 |
| 2003/0088659 A1 | 5/2003 | Susarla et al. |
| 2004/0187104 A1 | 9/2004 | Sardesai et al. |
| 2004/0193710 A1 | 9/2004 | Ushiki |
| 2005/0187894 A1 | 8/2005 | Pletcher et al. |
| 2005/0289538 A1 | 12/2005 | Black-Ziegelbein et al. |
| 2006/0253849 A1 | 11/2006 | Avram et al. |
| 2007/0174815 A1 | 7/2007 | Chrysanthakopoulos et al. |
| 2007/0239861 A1 | 10/2007 | Reeves et al. |
| 2008/0243725 A1 * | 10/2008 | Homan-Muise et al. ...... 705/400 |
| 2008/0250501 A1 * | 10/2008 | Wei et al. ........................ 726/23 |
| 2008/0320118 A1 * | 12/2008 | Uchida ........................ 709/221 |
| 2009/0288161 A1 * | 11/2009 | Wei et al. ........................ 726/22 |

OTHER PUBLICATIONS

Andrei Sabelfeld Chalmers, Language-Based Security, Jul. 2001.*
Hall, et al., "A Cooperative Approach to Support Software Deployment Using the Software Dock",Proceedings of the 21st International Conference on Software ,1999, IEEE, pp. 1-10.
Martin, et al., "Automated Generic Operating System Installation and Maintenance", Proceedings of the 3rd conference on Large Installation System Administration of Windows NT Conference, vol. 3, 2000, USENIX Association, pp. 9.

* cited by examiner

*Primary Examiner* — Lechi Truong
(74) *Attorney, Agent, or Firm* — Capitol City TechLaw; Richard C. Irving

(57) ABSTRACT

A method and a processing device may be provided for state management of an operating system and applications. A framework may be provided for separating behaviorless state information from code or instructions for executing a method. Applications may have instances of state information derived from, or completely different from, instances of state information of an operating system. Instances of state information for an application may be layered over corresponding instances of state information of the operating system, such that the application and the operating system may have different views of the instances of the state information. At least one policy may be defined, which may include rules for resolving conflicts, information for providing a merged view of data from multiple repositories, default values for instances of data, as well as other information. In various implementations, referential integrity of state information may be guaranteed.

11 Claims, 5 Drawing Sheets

STATE MANAGEMENT OF OPERATING SYSTEM AND APPLICATIONS

BACKGROUND

Existing processing systems include an operating system (OS) and one or more applications. Due to a number of entities, such as, for example, systems and applications, and a significant number of relationships among the entities, the existing processing systems are extremely complex, such that many OS deployment and OS management scenarios are too non-deterministic. For example, in some processing systems, changing one bit of a system setting, or configuration information, may cause the processing systems to crash. In addition, simply installing an application on a processing system may cause the processing system to behave in an unpredictable manner because the application may directly modify contents of memory locations, which may store data that belongs to other applications or the OS.

In existing processing systems, nothing exists to guarantee integrity of a state of an OS. That is, at any given time, no one can predict with 100% certainty how the OS will behave based on the state. Further, no tools exist that indicate, deterministically, that if a particular change is made to an OS state, that a particular result will occur.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a method and a processing device may be provided for managing an OS and applications. A framework may be provided for separating behaviorless state information from code or instructions for executing a method. Applications may maintain their own state information and may have instances of state information derived from, or completely different from, instances of state information of an OS. In some implementations, instances of state information for an application may be layered over corresponding instances of state information of the OS, such that the application may have one view of the instances of the state information and the OS may have a different view of the instances of the state information.

Type information may define a format and compatible values for all instances of data of a same type.

At least one policy may be defined to provide rules for resolving conflicts, information for providing a merged view of data from multiple sources, default values for instances of data, as well as other information.

In various embodiments consistent with the subject matter of this disclosure, referential integrity of instances of state information may be guaranteed. For example, if at least some state information is dependent upon references to other state information, and at least some of the other state information does not exist, or is not accessible, then an application associated with the state information may not be permitted to be installed or executed.

In some embodiments, a system may be provided, which may include an aggregator, multiple repositories, one or more policies, and a referential integrity enforcer. The aggregator may provide a single point of access, by the OS and applications, to instances of state information included in multiple repositories. The policy may denote how to provide a merged view of the instances of state information included in the multiple repositories. The referential integrity enforcer may ensure referential integrity of the state information.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

A method and a processing device are provided for managing an OS and applications. A framework may be provided for separating state information, which may include instances of data and type information, from instructions for executing a method. Applications may maintain their own state information, which may be separate from the state information of the OS. In some cases, an instance of the state information for the application may be created and may be layered over any corresponding state information of the OS.

Each instance of data of the state information may have an associated type, which may define a format of the instance of data and compatible values for the instance of data. Further, one or more policies may be defined, which may include rules for resolving conflicts, information for providing a merged view of data from multiple repositories, default values for instances data items when the data items have an incompatible value, as well as other information.

State information may depend on other state information existing, or being accessible. Checks may be made to determine whether any of the state information is dependent upon references to the other state information. If at least some of the state information is dependent upon references to the other state information, and at least some of the other state information does not exist, or is not accessible, then an application associated with the state information may not be installed, or may not be permitted to execute. Further, the other state information may not be removed, or made inaccessible, when any state information is dependent upon references to the other state information.

Exemplary Processing Device

Figure 1:
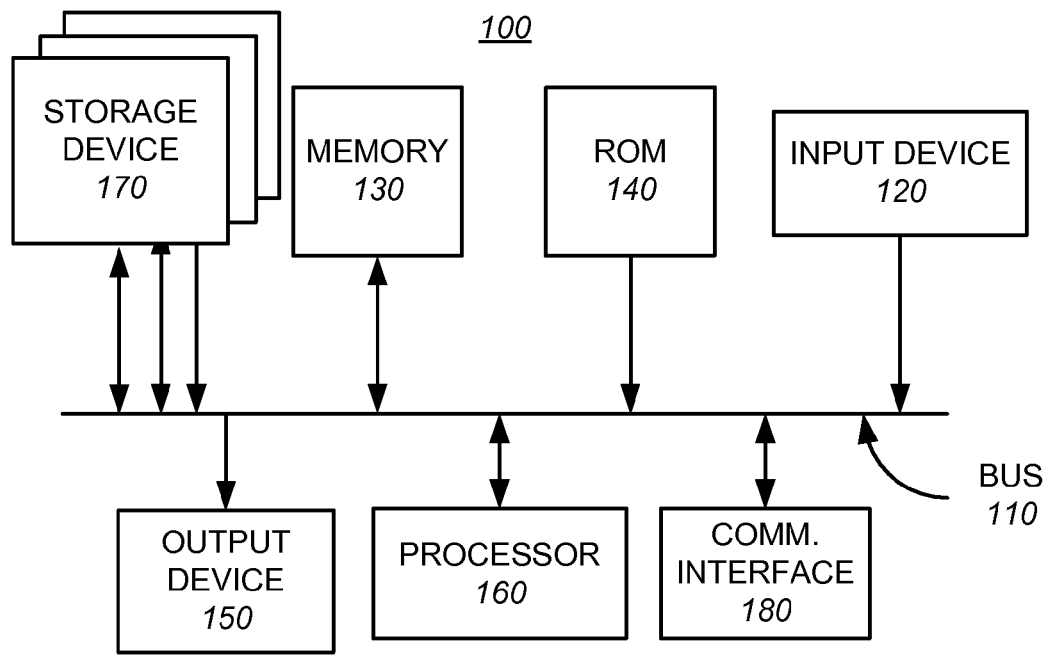
FIG. 1 illustrates a functional block diagram of an exemplary processing device, which may implement embodiments consistent with the subject matter of this disclosure.

FIG. 1 is a functional block diagram of an exemplary processing device 100, which may be used to implement embodiments consistent with the subject matter of this disclosure. Processing device 100 may be a desktop personal computer (PC), a laptop PC, a handheld processing device, or other processing device. Processing device 100 may include a bus 110, an input device 120, a memory 130, a read only memory (ROM) 140, an output device 150, a processor 160, and one or more storage devices 170. Bus 110 may permit communication among components of processing device 100.

Processor 160 may include at least one conventional processor or microprocessor that interprets and executes instructions. Memory 130 may be a random access memory (RAM) or another type of dynamic storage device that stores information and instructions for execution by processor 160. Memory 130 may also store temporary variables or other intermediate information used during execution of instructions by processor 160. ROM 140 may include a conventional ROM device or another type of static storage device that stores static information and instructions for processor 160. Storage device 170 may include compact disc (CD), digital video disc (DVD), a magnetic medium, a flash RAM device, or other type of storage device for storing data and/or instructions for processor 160.

Input device 120 may include a keyboard, a pointing device or other input device. Output device 150 may include one or more conventional mechanisms that output information, including one or more display monitors, or other output devices.

Processing device 100 may perform functions in response to processor 160 executing sequences of instructions contained in a tangible machine-readable medium, such as, for example, memory 130, ROM 140, storage device 170 or other medium. Such instructions may be read into memory 130 from another machine-readable medium or from a separate device via communication interface 180.

In some embodiments, processing device 100 may have no storage device 170 or a single storage device 170. In these embodiments, processing device 100 may access one or more remote storage devices via a network (not shown).

Understanding State

Relying on an object-oriented (OO) paradigm, an object may be defined as a tuple of {Identity, Behavior and State}, which may exist in space and time. Objects may have different lifetimes. For example, some objects may exist only for a specific computation, while other objects may exist in time independently from applications.

Behavior is a union of programming code and state. A state of an object may be defined as a tuple of {Identity, Data and Consistency}. Identity may uniquely define a type of state and may distinguish the state from other states. Generally, an identity of a state may be indistinguishable from an identity of an object. Consistency defines integrity of an object.

The definition of an object may be further generalized by introducing two orthogonal notions:
a stateless object that provides implementation only; and
a stateful but behaviorless object.

Thus, an object may be redefined as a tuple of {Identity, stateless Implementation and behaviorless State}. State identity may be a type in a same way as object identity. Typing may be defined as an enforcement of a class of an object, such that objects of different types may not be interchanged, or may be interchanged in a restrictive manner.

The redefined definition of an object assumes object consistency, which may be guaranteed by state or entity integrity and referential integrity. In other words, all references of an object are resolved.

Persistence may be defined as a property of an object through which the object transcends time and/or space by maintaining object consistency and referential integrity. In other words, the object may continue to exist after its creator ceases to exist, or a location of the object may change from an address space in which it was created.

Figure 2:
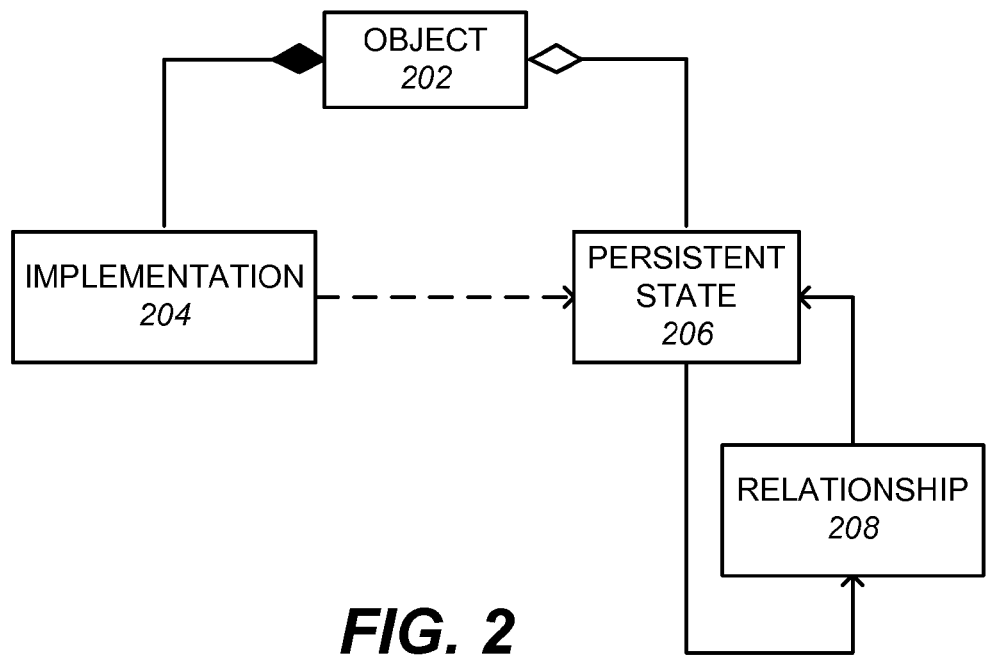
FIG. 2 illustrates a meta-pattern, or design, of a system in which state information may be separated from behavior or implementation information.

Persistent state may be defined according to a meta-pattern illustrated in FIG. 2. According to FIG. 2, persistent state may be defined by a notion of a behaviorless state (persistent state 206) and a relationship 208. Persistent state 206 may include data and type information, in an OO sense, which may define compatible values for the data. Relationship 208 may include information with respect to referential integrity of persistent state 206. An object may be defined as a tuple of {Identity, stateless Implementation (implementation 204) and behaviorless State (persistent state 206 and relationship 208)}.

Exemplary Conceptual Design

Figure 3:
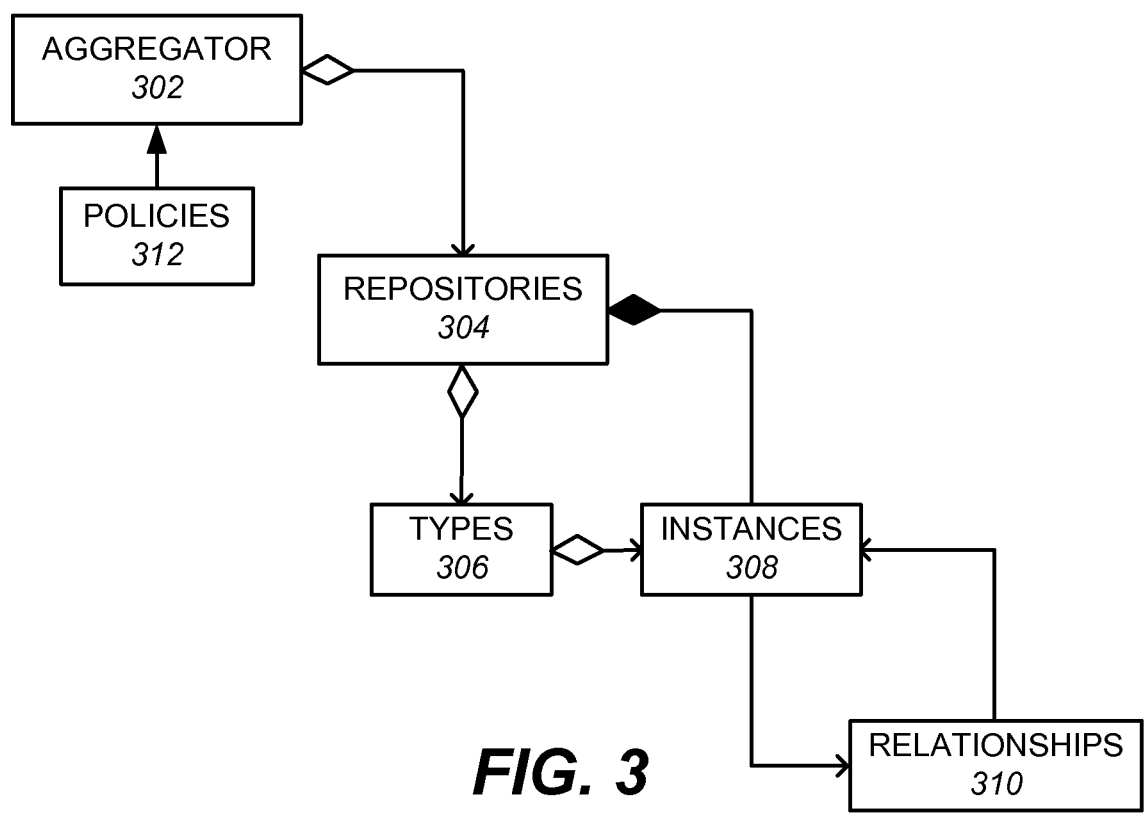
FIG. 3 shows an exemplary conceptual design of a state management infrastructure consistent with the subject matter of this disclosure.

FIG. 3 illustrates an exemplary conceptual design of a state management infrastructure. The state management infrastructure may include an aggregator 302, one or more repositories 304, types 306, instances 308, relationships 310, and one or more policies 312.

Aggregator 302 may merge one or more repositories 304 into a single point of access. In this exemplary design all repositories may be equivalent. One or more policies 312 and an application (not shown) may define which of one or more repositories 304 are attached or detached. One or more repositories 304 may include state information, further including one or more of type 306 and one or more of instances 308 of state information. One or more of relationships 310 may provide information with respect to referential integrity of one or more of instances 308, which may be scattered across multiple physical repositories. Aggregator 302 may use deterministic rules, defined by one or more policies 312, to present a merged view of data.

One or more repositories 304 may represent one or more physical stores having uniform access. One or more repositories 304 may provide enumeration, creation, modification and access to instances of supported types.

One or more repositories 304 may advertise contents in a single namespace. Thus, an overlap may exist for a particular type and a particular instance with a same identity. For example, two of repositories 304 may have a file extension definition for a same file extension. One or more policies 312 may define conflict resolution rules for determining which of the file extension definitions may override another. As an example, suppose an application is stored completely on a flash RAM device. When the flash RAM device is connected to a processing device, the OS may attach the flash RAM device, which may include a particular file extension registration. The OS may detect a conflict with respect to the particular file extension registration, and may resolve the conflict by choosing the file extension registration from the flash RAM device. When the flash RAM device is detached from the processing device, a pre-existing instance for the particular file extension registration may become discoverable. Thus, the OS may allow temporary changes without actually changing any state information of the OS.

Types 306 may define types for instances 308, conflict resolution logic for merged views, meta-operations for a specific type, as well and other items. Examples of meta-operations may include, but not be limited to: performance counters in a transparent layer injected to gather data, such as, for example, statistics, or other data, and to expose the data for consumption by interested parties; black (white) lists when a layer may reject aggregation of a state or application which is blacklisted; incremental backups of changes which are intercepted by a layer and saved; and caching performed by a layer when the layer anticipates use of a particular set of instances before the particular set of instances are used. Further, a type may be derived from an other type and may inherit attributes from the other type. Each instance 308 may be created, or instantiated, and may be accessible through an interface defined by the type. Each of instances 308 may support several interfaces, including a generic interface for persistence, an interface with respect to relationships of particular instances, and other interfaces.

Exemplary Processing

Figure 4:
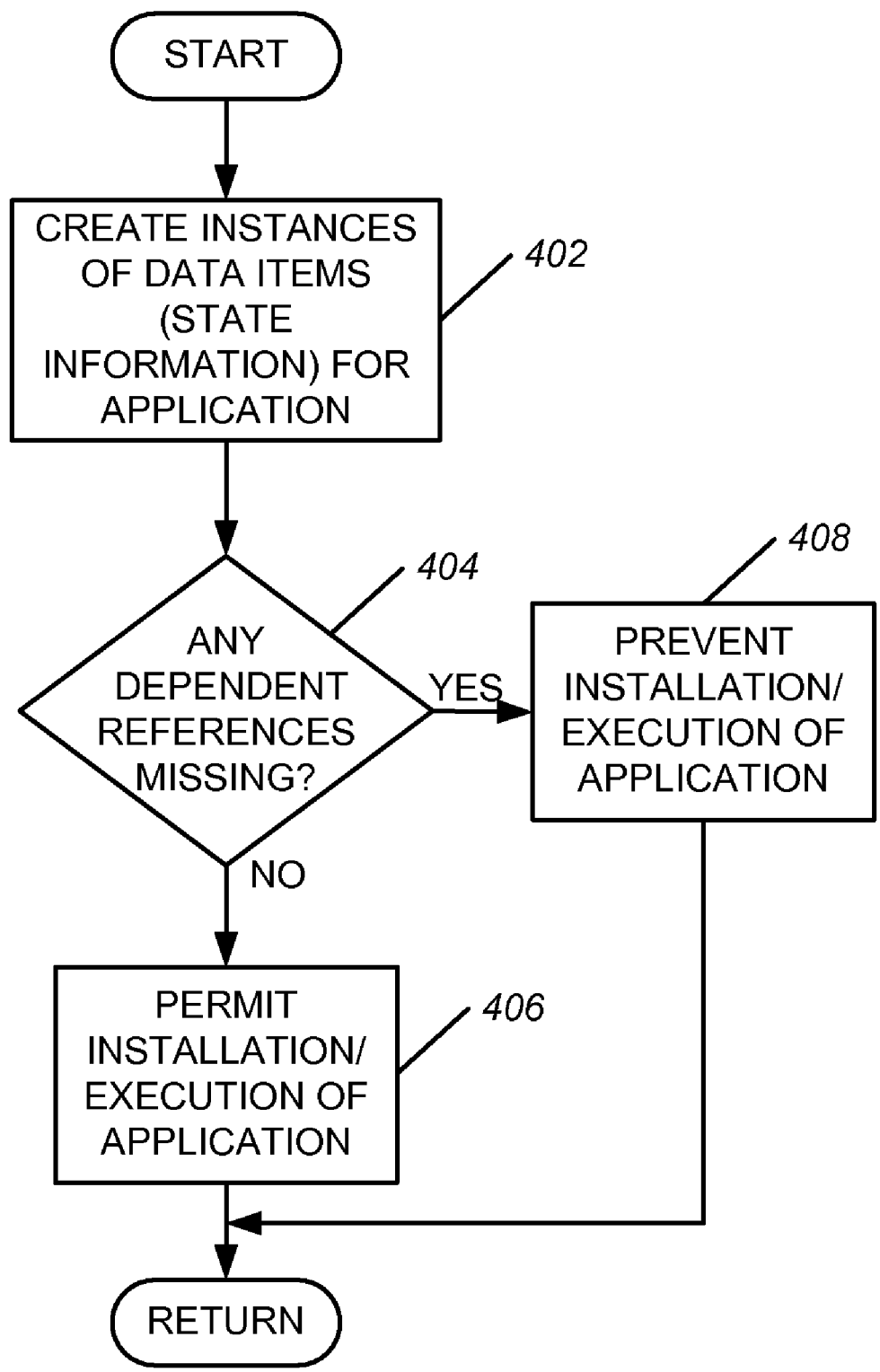
FIG. 4 is a flowchart of an exemplary process for executing or installing an application in embodiments consistent with the subject matter of this disclosure.

FIG. 4 is a flowchart illustrating an exemplary process, which may be performed in embodiments consistent with the subject matter of this disclosure. A processing device may create instances, or instantiate, data items, with respect to state information, for an application (act 402). A check may be made to determine whether any of the data items depend on references that are missing or inaccessible (act 404). If any of the data items depend on references that are missing or inaccessible, then installation or execution of the application may be prevented (act 408). Otherwise, installation or execution of the application may be permitted (act 406).

Figure 5:
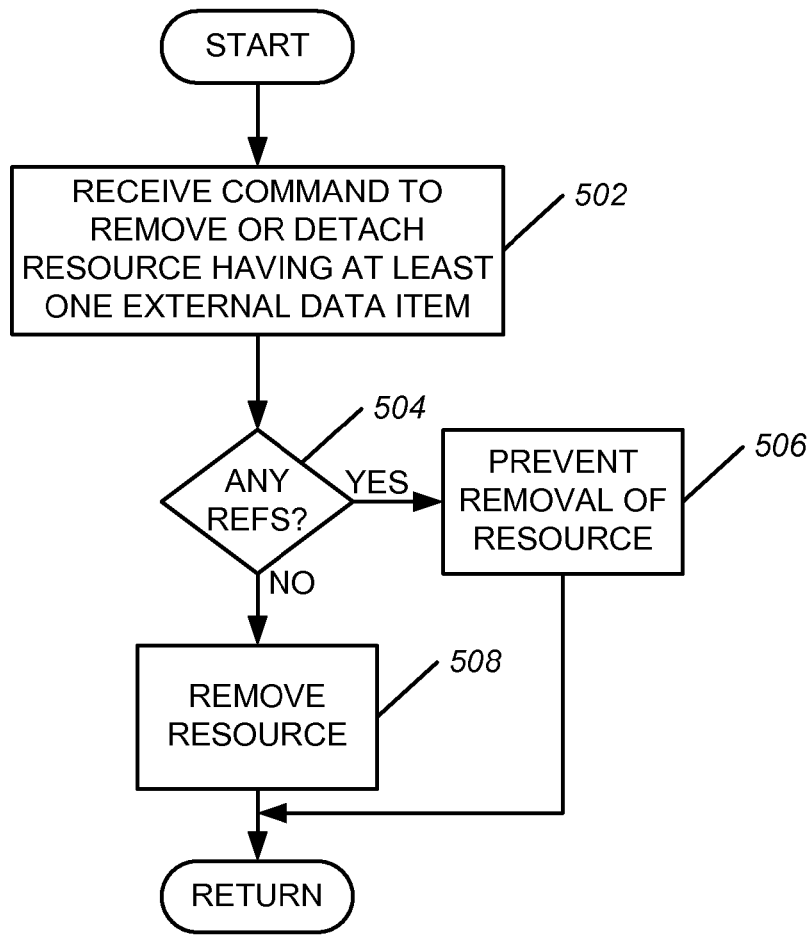
FIG. 5 is a flowchart of an exemplary process for guaranteeing referential integrity in embodiments consistent with the subject matter of this disclosure.

FIG. 5 is a flowchart illustrating an exemplary process for removing or detaching a resource from a system executing on a processing device. The process may begin with a command being received to remove or detach a resource, which has at least one data item (act 502). A check may be performed to determine whether any state has a reference to the at least one data item (act 504). If a state has a reference to the at least one data item, then removal or detachment of the resource may be prevented (act 506). Otherwise, the resource may be removed (act 508).

Data Transformation

Figure 6:
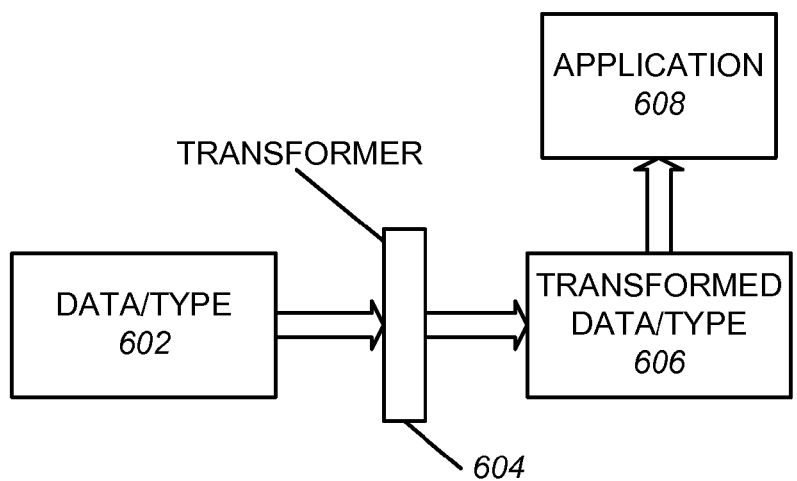
FIG. 6 is a functional block diagram illustrating an instance of data or type information being transformed for an application.

Data or type information from an application or an OS may be changed, or transformed, according to one of one or more policies 312. FIG. 6 illustrates an instance of data or type information being transformed for an application. Data or type information 602 from the OS or an application may be accessed by a transformer 604, which may be included in aggregator 302. Transformer 604 may transform an instance of data or type information 602, according to the one of one or more policies 312, and may store a transformed instance of data or type information 606 as state information for an application 608. As an example, application 608 may be a word processing application and data or type information 602 may be a type with respect to state information of a second word processing application. Transformer 604, in this example, may transform the type with respect to the state information of the second word processing application to a type understood by the word processing application represented by application 608, without actually changing any instance of data or type information 602.

Layered Stack

Figure 7:
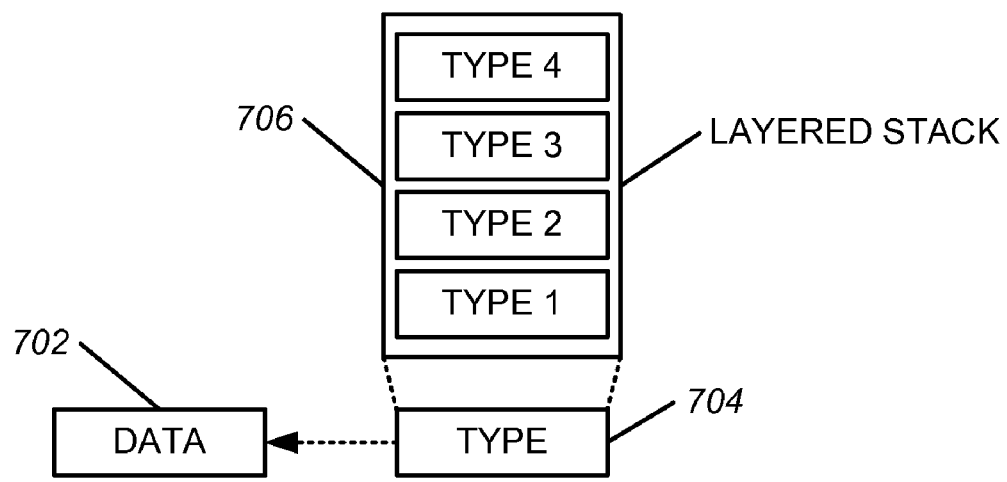
FIGS. 7 and 8 are diagrams illustrating, respectively, type information and instances of data being accessed through a layered stack in embodiments consistent with the subject matter of this disclosure.

Type information may be accessed directly or through a layered stack, which may be defined by a policy. FIG. 7 illustrates an instance of data 702 of type 704. Type information, such as, for example, type 1, type 2, type 3, and type 4, may be included in a layered stack 706. The policy may define which layers of layered stack 706 apply to which applications. For example, a first application may view instance of data 702 as being of type 1, while a second application may view instance of data 702 as being of type 2.

Figure 8:
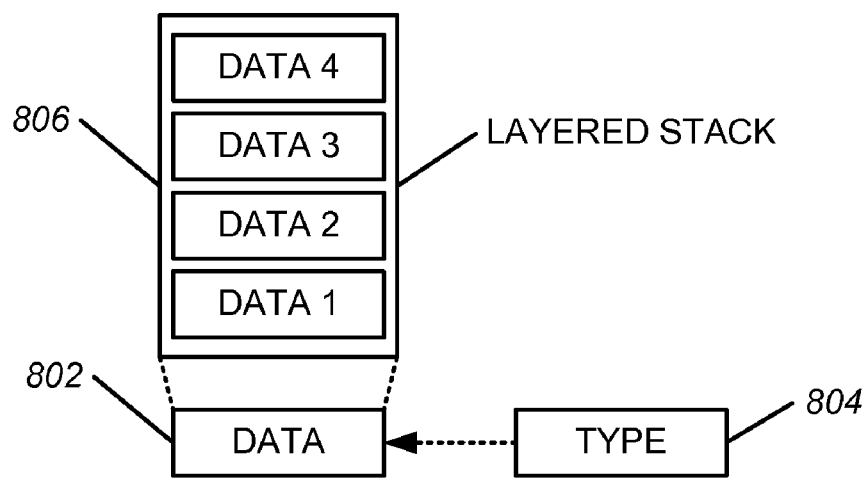

Similarly, instances of data may be stored in a layered stack. FIG. 8 illustrates instance of data 802 of type 804. Data items, such as, for example, data 1, data 2, data 3, and data 4, may be included in a layered stack 806. The policy may define which layers of layered stack 806 apply to which applications. For example, a first application may view data 1 of layered stack 806, instead of instance of data 802, while a second application may view data 2 of layered stack 806, instead of instance of data 802. Embodiments of aggregator 302 may provide different views of a set of instances of state information via a layered stack of data types.

Conclusion

The above exemplary designs may allow granular control over types and instances of state information, which may be driven by one or more defined policies. For example, one or more policies may be defined such that any reference from a repository to an application or to certain other higher-level repositories may not be permitted. Further, one or more policies may be defined such that links from bottom layers to top layers may be deterministically detected and prevented without affecting an integrity of repositories.

The exemplary designs may permit consistency and integrity for a system to be defined and enforced and may prevent destructive actions, with respect to instances of state information, to be prevented or contained.

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not be construed as limiting the claims in any way. Other configurations of the described embodiments are part of the scope of this disclosure. Further, implementations consistent with the subject matter of this disclosure may have more or fewer acts than as described with respect to FIGS. 4-5, or may implement acts in a different order than as shown. Accordingly, the appended claims and their legal equivalents define the invention, rather than any specific examples given.

We claim as our invention:

1. A system for state managing an operating system and applications, the system comprising:
   a plurality of repositories including instances of state information;
   at least one processor; and
   a memory connected to the at least one processor, the memory comprising:
      instructions for the at least one processor to implement an aggregator to provide a single point of access to instances of state information by the operating system and the applications, the aggregator being further for accessing definitions of data types corresponding to the instances of the state information and for accessing the data types and the instances of the state information either directly or through a layered stack, the data types defining rules with respect to valid values for the instances of the state information;
      a policy denoting how to provide a merged view of the instances of the state information included in a plurality of repositories, the policy being for use by the aggregator to provide the merged view of the instances of the state information, the layered stack being defined by the policy; and
      instructions for the at least one processor to implement a referential integrity enforcer to ensure referential integrity with respect to the instances of the state information.

2. The system of claim 1, wherein:
   names of the instances of the state information are defined in a single namespace.

3. The system of claim 1, wherein:
   the data types define corresponding types for the instances of the state information and conflict resolution logic for the instances of the state information.

4. The system of claim 1, wherein the aggregator is further for providing different views of a set of the instances of the state information via the layered stack with respect to the set of instances of the state information.

5. A machine-readable storage device having recorded thereon instructions for at least one processor, when the at least one processor executes the instructions a method is performed, the method comprising:
   providing a single point access to instances of state information by an operating system and the applications and definitions of data types corresponding to the instances of the state information, the data types and the instances of the state information being accessed either directly or through a layered stack;
   providing a plurality of repositories including the instances of the state information;
   providing a view of the instances of the state information included in the plurality of repositories based on the definitions of the corresponding data types and a policy denoting how to provide the view, the layered stack being defined by the policy; and
   enforcing referential integrity with respect to the instances of the state information.

6. The machine-readable storage device of claim 5, wherein the method further comprises:
   providing a plurality of views of a same set of instances of the state information.

7. The machine-readable storage device of claim 6, wherein the providing a plurality of views of a same set of instances of the state information further comprise:
   providing the plurality of views based on the layered stack built on top of type definitions corresponding to the same set of instances of the state information.

8. The machine-readable storage device of claim 5, wherein the enforcing referential integrity with respect to the state information further comprises:
   preventing detachment of a reference upon which any of the instances of the state information depends.

9. The machine-readable storage device of claim 5, wherein the providing a view of the instances of the state information based on the definitions of the corresponding data types and a policy denoting how to provide the view further comprises:
   providing a merged view of the instances of the state information, from a plurality of repositories, based on the policy.

10. The machine-readable storage device of claim 5, wherein the method further comprises:
    applying a policy to restore an instance of an item of state information to a default state when the instance of the item of state information is in an incompatible state.

11. The machine-readable storage device of claim 5, wherein the method further comprises:
    transforming, transparently with respect to an application, an instance of the state information to another instance of the state information for use by the application.

* * * * *